US012303909B2

(12) United States Patent
Stander et al.

(10) Patent No.: US 12,303,909 B2
(45) Date of Patent: May 20, 2025

(54) QUALITY MONITORING AND CONTROLS FOR A COMMINUTION SYSTEM USING IMAGING OF MATERIAL IN A DISCHARGE STAGE

(71) Applicant: Deere & Company, Moline, IL (US)

(72) Inventors: Francois Stander, Dubuque, IA (US); Jeremy B. Shuler, Polk City, IA (US)

(73) Assignee: Deere & Company, Moline, IL (US)

( * ) Notice: Subject to any disclaimer, the term of this patent is extended or adjusted under 35 U.S.C. 154(b) by 467 days.

(21) Appl. No.: 17/849,858

(22) Filed: Jun. 27, 2022

(65) Prior Publication Data

US 2023/0415166 A1   Dec. 28, 2023

(51) Int. Cl.
| | |
|---|---|
| *B02C 25/00* | (2006.01) |
| *B02C 1/02* | (2006.01) |
| *G06T 7/00* | (2017.01) |
| *G06T 7/13* | (2017.01) |
| *G06T 7/60* | (2017.01) |

(52) U.S. Cl.
CPC ............ *B02C 25/00* (2013.01); *B02C 1/025* (2013.01); *G06T 7/001* (2013.01); *G06T 7/13* (2017.01); *G06T 7/60* (2013.01)

(58) Field of Classification Search
CPC ......... B02C 25/00; B02C 1/025; G06T 7/13; G06T 7/001; G06T 7/60
See application file for complete search history.

(56) References Cited

U.S. PATENT DOCUMENTS

| | | |
|---|---|---|
| 4,804,148 A | 2/1989 | Etheridge |
| 4,909,449 A | 3/1990 | Etheridge |
| 9,301,447 B2 | 4/2016 | Kormann |
| (Continued) | | |

FOREIGN PATENT DOCUMENTS

| | | |
|---|---|---|
| DE | 102021117537 B3 | 10/2022 |
| WO | 2007051890 A1 | 5/2007 |
| (Continued) | | |

OTHER PUBLICATIONS

German Search Report issued in application No. DE102023110973.1 dated Jan. 15, 2024 (05 pages).

*Primary Examiner* — Utpal D Shah
(74) *Attorney, Agent, or Firm* — Gary L. Montle; Lucian Wayne Beavers; Patterson Intellectual Property Law, PC

(57) ABSTRACT

A method is provided for dynamically monitoring material quality in a comminution system comprising a material crushing stage and a discharge stage. An imaging device captures images of comminuted material in the discharge stage, and characteristic features are extracted from the captured image for analysis with respect to at least one boundary condition. Output signals are accordingly generated corresponding to a determined comminution state of the comminuted material in the discharge stage. In one example, a crushing gap in the crushing stage is adjusted if the comminution state indicates material (or an amount of material) above a threshold size in the discharge stage. In another example, pre-screen settings in a pre-screen stage of the comminution system are adjusted if the comminution state indicates material (or an amount of material) below a threshold size in the discharge stage. Other comminution states and responses may, e.g., correspond to non-compliant material shapes, etc.

20 Claims, 5 Drawing Sheets

(56) References Cited

U.S. PATENT DOCUMENTS

| | | |
|---|---|---|
| 9,779,330 B2 | 10/2017 | Campoy et al. |
| 10,279,354 B2 | 5/2019 | Young et al. |
| 2016/0250642 A1* | 9/2016 | Lindström ................ B02C 1/02 |
| | | 241/25 |
| 2020/0246804 A1 | 8/2020 | Eckert et al. |
| 2021/0239144 A1 | 8/2021 | Gnam et al. |
| 2021/0248428 A1* | 8/2021 | Sharma ................ G06F 18/214 |
| 2023/0010394 A1* | 1/2023 | Häberle ................ G06V 10/82 |

FOREIGN PATENT DOCUMENTS

| | | |
|---|---|---|
| WO | 2008153464 A1 | 12/2008 |
| WO | 2016095958 A1 | 6/2016 |

\* cited by examiner

QUALITY MONITORING AND CONTROLS FOR A COMMINUTION SYSTEM USING IMAGING OF MATERIAL IN A DISCHARGE STAGE

FIELD OF THE DISCLOSURE

The present disclosure relates generally to a method and system for monitoring and regulating material output quality from a material comminution system, wherein material which is to be crushed is fed to a crushing stage, and wherein one or more crushing characteristics are set and/or controlled according to analysis of captured images relating to the output material.

BACKGROUND

Material comminution systems, which may include mobile or stationary units and may otherwise be referred to herein as material crushers or crusher plants, are conventionally known for comminuting (crushing) material, for example stone material including but not limited to natural stone, concrete, brick, demolition rubble, recycling material, or the like.

One type of crusher as known in the art is an impact crusher, wherein the material to be crushed is seized by a fast-running rotor, accelerated, and thrown onto a stationary impact mechanism until it has been crushed to the desired grain size. In a cone crusher, crushing is performed in a continuously opening and closing crushing gap between a crushing hopper and a crusher spindle. The crusher spindle rotates along an eccentric trajectory. Jaw crushers, in which the crushed material is crushed in a wedge-shaped slot between a fixed jaw and a crusher jaw moved by an eccentric shaft, are also used.

The high forces required to crush the material are a common feature of such crushers. On jaw crushers for example it is common for an operator to stop the process one or two times a day so that a crusher gap can be adjusted in order to maintain a consistent output. This need for adjustment may arise because the wear surfaces of the crusher continually wear down and, at some point, the output of the comminution system no longer matches a desired output.

BRIEF SUMMARY

The current disclosure provides an enhancement to conventional systems, at least in part by introducing a novel comminution system and method for crushing plant setting adjustment and quality monitoring, using for example an imaging device, image analysis, and machine learning algorithms to monitor the output quality of the crushed material.

In a first exemplary embodiment as disclosed herein a computer-implemented method is provided for dynamically monitoring material quality in a comminution system comprising a material crushing stage and a discharge stage. The method includes capturing an image of comminuted material in the discharge stage via at least one imaging device, extracting one or more characteristic features from the captured image for analysis with respect to at least one boundary condition, and generating output signals corresponding to a determined comminution state of the comminuted material in the discharge stage based on the analysis with respect to the at least one boundary condition.

Further exemplary aspects according to the above-referenced first embodiment may include enabling user input corresponding to an acceptable comminution state, for example via a user interface functionally linked to a system controller, and dynamically setting or adjusting parameters for one or more of the at least one boundary condition based on an initial extracted one or more characteristic features responsive to the user input.

Further exemplary aspects according to the above-referenced first embodiment may include storing input data sets over time relating to the extracted one or more characteristic features for respective captured images of comminuted material, enabling user input corresponding to an unacceptable comminution state for at least one captured image of comminuted material, for example via a user interface functionally linked to a system controller, and dynamically setting or adjusting parameters for one or more of the at least one boundary condition based on the user input corresponding to an unacceptable comminution state and input data sets corresponding to the respective at least one captured image.

Further exemplary aspects according to the above-referenced first embodiment may include enabling user input selecting the one or more boundary condition to be applied from a plurality of available boundary conditions.

In a second embodiment, further exemplary aspects according to the above-referenced first embodiment may include extracting one or more characteristic features from the captured image for analysis with respect to at least one boundary condition comprises comparing a determined size of comminuted material in the discharge state to a size threshold.

In a third embodiment, further exemplary aspects according to the above-referenced second embodiment may include determining a relative amount of comminuted material exceeding an oversize threshold and generating the output signals based on the relative amount.

Further exemplary aspects according to the above-referenced third embodiment may include automatically controlling a position of at least a first crushing jaw to reduce a material crusher gap in response to the generated output signals.

Further exemplary aspects according to the above-referenced third embodiment may include determining a trend over time in a relative amount of comminuted material exceeding the oversize threshold and generating the output signals based on a predicted violation of a predetermined relative threshold value.

In a fourth embodiment, further exemplary aspects according to the above-referenced second embodiment may include determining a relative amount of comminuted material below an undersize threshold and generating the output signals based on the relative amount.

Further exemplary aspects according to the above-referenced fourth embodiment may include automatically controlling one or more pre-screen settings in a pre-screen stage of the comminution system in response to the generated output signals.

Further exemplary aspects according to the above-referenced fourth embodiment may include determining a trend over time in a relative amount of comminuted material below the undersize threshold and generating the output signals based on a predicted violation of the predetermined relative threshold value.

In a fifth embodiment, further exemplary aspects according to any of the above-referenced first to fourth embodiments may include that extracting one or more characteristic features from the captured image for analysis with respect to at least one boundary condition comprises comparing a determined shape of comminuted material in the discharge state to a predetermined library of acceptable shape configurations.

Further exemplary aspects according to the above-referenced fifth embodiment may include determining a relative amount of unacceptable shape configurations among the comminuted material.

In a sixth embodiment, a comminution system as disclosed herein may include material crushing stage comprising a crusher having a settable crusher gap, and a discharge stage configured to receive at least comminuted material from the material crushing stage and to convey the material from the comminution system. At least one imaging device is configured to capture an image of comminuted material in the discharge stage. A controller is functionally linked to receive the captured image from the at least one imaging device and further configured to direct the performance of steps in a method according to any of the above-referenced first to fifth embodiments. In one exemplary aspect, the comminution system may further comprise a pre-screen stage configured to receive input feed material and to filter and selectively convey the material based on a relative size thereof, wherein the material crushing stage is configured to receive at least a portion of the filtered material from the pre-screen stage.

Numerous objects, features and advantages of the embodiments set forth herein will be readily apparent to those skilled in the art upon reading of the following disclosure when taken in conjunction with the accompanying drawings.

DETAILED DESCRIPTION

With reference herein to the representative figures, various embodiments may now be described of inventive systems, apparatus, and methods for settings adjustment and quality monitoring of a crushing plant.

Generally stated, certain embodiments of a comminution system as disclosed herein may be used to determine when the crushed material includes too many pieces that exceed a pre-set size threshold. When this happens, the system could automatically adjust the crushing gap until the max material size drops to the lower end of a pre-set threshold. Alternatively, or in addition, the system could alert the operator that an adjustment needs to be made. The system could also monitor the output to determine when there is too much fine material in the output. This could also result in an alert to the operator to adjust the type of material that is being used, alert the operator that the pre-screen is clogged, or it could have the machine adjust the pre-screen settings to resolve the problem. On a cone crushing plant the system could be used to monitor the shape of the output and alert the operator when the output material no longer meets a pre-defined shape requirement. This same system could be used on the output of a screening plant to determine output material quality: too many large particles for a given output; too much fine content in a given output. This information could then be used to alert the operator that the process is out of specification and that adjustments need to be made (like screens need to be cleaned) or the system could make setting adjustments to automatically resolve the issue.

Figure 1:
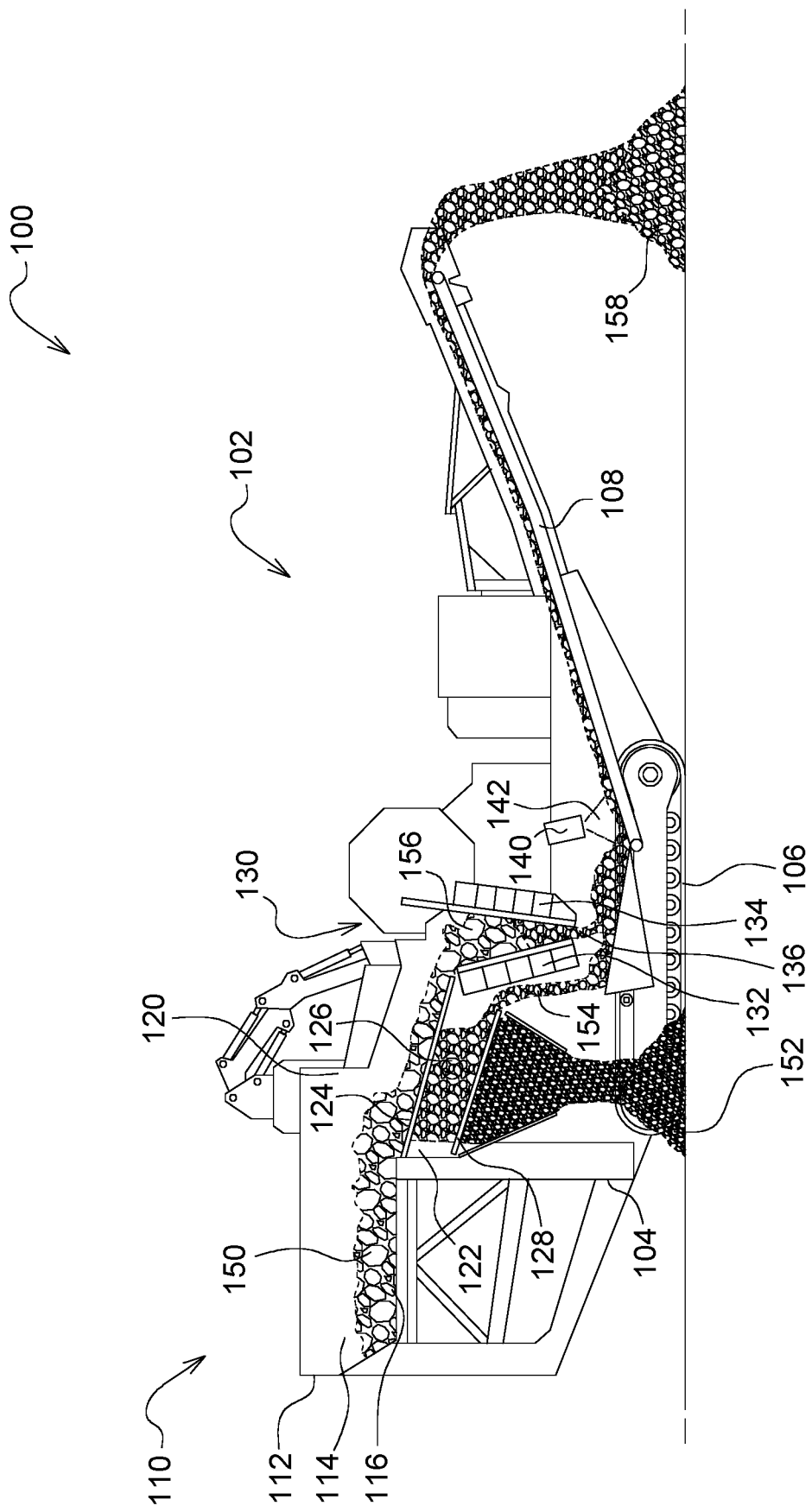
FIG. 1 is a side view of an exemplary embodiment of a comminution system in the form of a work machine according to the present disclosure.

FIG. 1 in a particular embodiment as disclosed herein shows a material comminution system 100 comprising a crusher 102. The material comminution system 100 may be configured as a mobile system with a chassis 104 and a chain drive 106. The exemplary material comminution system has a feed unit 110, a pre-screen stage 120, a crushing stage 130, and a discharge stage including at least one conveyor including a crusher discharge belt 108.

A hopper 112 may be arranged in the region of the feed unit 110. The hopper has hopper walls 114. The hopper 112 deflects supplied feed material 150 onto a vibrating feed channel 116.

The vibrating feed channel 116 conveys the feed material 150 to a double-deck prescreen 122 of the pre-screen stage 120. The double-deck heavy-piece screen 122 has an upper deck 124 configured as a relatively coarse screen and a lower deck 128 configured as a relatively fine screen. The double-deck heavy-piece screen is set in circular vibration by a drive 126. The upper deck 124 separates the fine content 152 and the medium content 154 from the material 156 to be crushed. The lower deck 128 separates the fine content 152 from the medium content 154. The fine content 152 may optionally be conducted out of the material comminution system 100 or supplied to the medium content 154 by a corresponding position of a bypass flap. The medium content 154 is accordingly guided past the crushing stage 130 via a bypass to the crusher discharge belt 108. The material 156 to be crushed is supplied at the end of the pre-screen stage 120 to the crushing stage 130 via a crusher inlet.

The crusher 102 in the illustrated embodiment is configured as a jaw crusher. However, it is also conceivable to provide other crushers 102, for example impact crushers or cone crushers. The crusher 102 has a fixed crushing jaw 132 and a mobile crushing jaw 134. These crushing jaws 132, 134 are oriented so as to run obliquely to one another so that a shaft which tapers conically toward a crushing gap 136 is configured therebetween. The mobile crushing jaw 134 may be driven by an eccentric connected via a drive shaft (not shown) to a drive unit of the material comminution system 100. The drive unit may serve as, or as a component in, a crusher drive control 228. It may also be used as, or as a component in, a conveyor drive control 226 and/or a chain drive control 224 and optionally further mobile components of the material comminution system 100. By means of the eccentric the mobile crushing jaw 134 is moved in an elliptical movement toward the fixed crushing jaw 132 and away therefrom. During such a stroke, the spacing also alters between the crushing jaws 132, 134 in the region of the crushing gap 136.

In one example (not shown), the mobile crushing jaw 134 may be fastened to a movably mounted swing jaw, with the eccentric acting thereon. The swing jaw may be supported by a pressure plate in the direction of the crushing gap 136, with the pressure plate connected to a gap setting device opposite the swing jaw. By means of the gap setting device the width of the crushing gap 136 and thus the grain size of the comminuted material 158 may be set.

By the movement of the mobile crushing jaw 134, the material to be crushed 156 is increasingly comminuted along the conical shaft until it has reached a grain size which permits it to leave the shaft through the crushing gap 136. The comminuted material 158 drops onto the crusher discharge belt 108 and is transported away thereby.

An imaging device 140 may be assigned to the crusher 102, and more particularly in the present embodiment may be mounted on a frame of the crusher 102 in association with the discharge stage such that a field of view 142 for the imaging device 140 includes comminuted material 158 being discharged via the crusher discharge belt 108.

Figure 2:
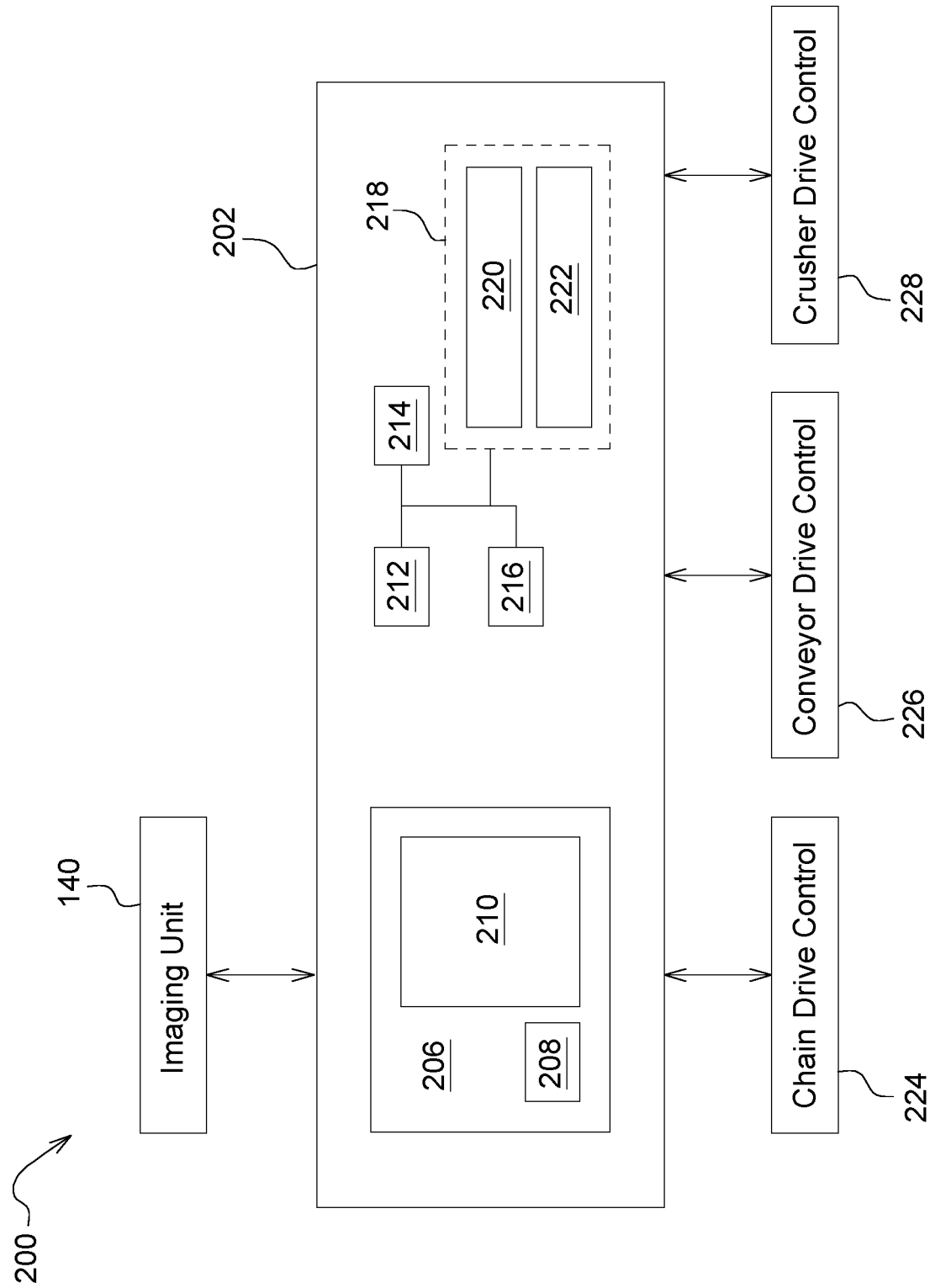
FIG. 2 is a block diagram representing a control system according to an embodiment of the present disclosure.

As schematically illustrated in FIG. 2, the comminution system 100 may include a control system 200 including a controller 202. The controller 202 may be part of the machine control system of the crusher 102, or it may be a separate control module.

The controller 202 is configured to receive input signals including or corresponding to captured images or equivalent material characterizing data from the imaging device 140. In an embodiment, imaging devices 140 as disclosed herein may include video cameras configured to record an original image stream and transmit corresponding data to the controller 202. In the alternative or in addition, imaging devices 140 may include one or more of an infrared camera, a stereoscopic camera, a PMD camera, or the like. One of skill in the art may appreciate that in certain embodiments high resolution light detection and ranging (LiDAR) scanners, radar detectors, laser scanners, and the like may be implemented as part of the imaging device 140 or otherwise alongside the above-referenced examples within the scope of the present disclosure. The number and orientation of imaging devices 140 or components thereof may vary in accordance with the type of comminution system 100 and relevant applications, but may typically be configured to capture image data associated with at least an entire width of the crusher discharge belt 108.

The position and size of an image region 142 recorded by a respective camera as an imaging device 140 may for example depend on the arrangement and orientation of the camera and the camera lens system, in particular the focal length of the lens of the camera, but may desirably be configured to capture substantially the entire width of the crusher discharge belt 108 during a material comminuting operation. However, an imaging device 140 configured to capture only a portion of comminuted material 158 being discharged from the crusher 102 may in some embodiments be satisfactory, as a determined percentage of a subset of the comminuted material 158 being outside of defined boundary conditions may be satisfactorily representative of a percentage of the entirety of the comminuted material 158 being outside of the defined boundary conditions.

Various image data processing functions may be performed discretely at a given imaging device 140 if properly configured, but also or otherwise may generally include at least some image data processing by the controller 202 or other downstream data processor. For example, image data from any one or more imaging devices 140 may be provided for three-dimensional point cloud generation, image segmentation, object delineation and classification, and the like, using image data processing tools as are known in the art in combination with the objectives disclosed.

In various embodiments, image data processing functions may include a framework for extracting characteristic features from an image based at least in part on learned and implemented attributes associated with previous images and/or input data sets, which may for example have been classified, tagged, labeled, or otherwise associated with comminution states for determining an appropriate action.

The controller 202 of the comminution system 100 may be configured to produce outputs, as further described below, to a user interface 206 associated with a display unit 210 for display to the human operator. The controller 202 may be configured to receive inputs from the user interface 206, such as user input provided via interface tools 208 (e.g., keyboard, touch screen, buttons) associated with the user interface 206. Not specifically represented in FIG. 2, the controller 202 of the comminution system 100 may in some embodiments further receive inputs from and generate outputs to remote devices associated with a user via a mobile computing device or the like. Data transmission between for example the crusher control system and a remote user interface may take the form of a wireless communications system and associated components as are conventionally known in the art. In certain embodiments, a remote user interface and control systems for respective work machines 102 may be further coordinated or otherwise interact with a remote server or other computing device for the performance of operations in a system as disclosed herein.

The controller 202 may in various embodiments be configured to generate control signals for controlling the operation of respective actuators, or signals for indirect control via intermediate control units, associated with a chain drive control 224, a conveyor drive control 226, a crusher drive control 228, or the like. The controls 224, 226, 228 may be independent or otherwise integrated together or as part of a machine control unit in various manners as known in the art. The controller 202 may for example generate electronic control signals for controlling the operation of various actuators and/or drive component (not shown).

The controller 202 includes or may be associated with a processor 212, a computer readable medium 214, a communication unit 216, and data storage 218 such as for example a database network. It is understood that the controller 202 described herein may be a single controller having some or all of the described functionality, or it may include multiple controllers wherein some or all of the described functionality is distributed among the multiple controllers.

Various operations, steps or algorithms as described in connection with the controller 202 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium 214 can be coupled to the processor 212 such that the processor 212 can read information from, and write information to, the memory/storage medium 214. In the alternative, the medium 214 can be integral to the processor 212. The processor 212 and the medium 214 can reside in an application specific integrated circuit (ASIC). The ASIC can reside in a user terminal. In the alternative, the processor 212 and the medium 214 can reside as discrete components in a user terminal.

The term "processor" 212 as used herein may refer to at least general-purpose or specific-purpose processing devices and/or logic as may be understood by one of skill in the art, including but not limited to a microprocessor, a microcontroller, a state machine, and the like. A processor 212 can also be implemented as a combination of computing devices, e.g., a combination of a DSP and a microprocessor, a plurality of microprocessors, one or more microprocessors in conjunction with a DSP core, or any other such configuration.

The communication unit 216 may support or provide communications between the controller 202 and external communications units, systems, or devices, and/or support or provide communication interface with respect to internal components of the comminution system 100. The communications unit 216 may include wireless communication system components (e.g., via cellular modem, WiFi, Bluetooth or the like) and/or may include one or more wired communications terminals such as universal serial bus ports.

The data storage 218 as further described below may, unless otherwise stated, generally encompass hardware such as volatile or non-volatile storage devices, drives, electronic memory, and optical or other storage media, as well as in certain embodiments one or more databases residing thereon. In an embodiment, the data storage 218 may be configured to receive and retrievably store data sets, models, and/or algorithms, for further performing programmatic operations or the like as further disclosed herein, including but not limited to characteristic features 220 extracted from captured images using image processing, boundary conditions 222 as set manually via user input or as automatically determined or dynamically adjusted over time, etc.

Figure 3:
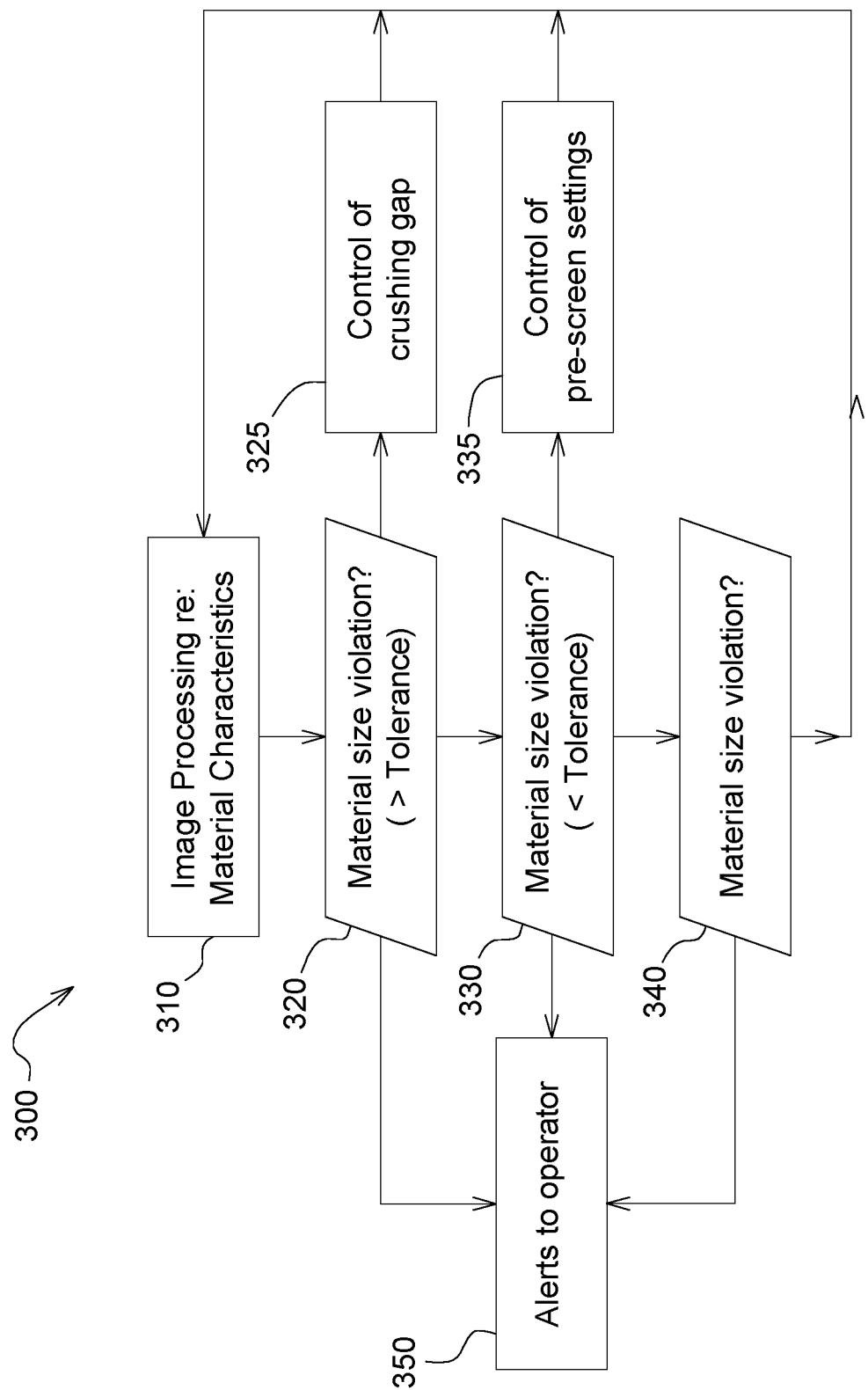
FIG. 3 is a flowchart representing an exemplary method according to an embodiment of the present disclosure.

Referring next to FIG. 3, with further illustrative reference to FIGS. 4 and 5, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously.

Various embodiments of a method 300 as disclosed herein may generally be provided for dynamically monitoring material quality in a comminution system 100 at least in part by capturing images of comminuted material 158 in a discharge stage, e.g., being discharged from the crusher 102 via at least one crusher discharge belt 108. More particular to the embodiment as represented in FIG. 3, the method 300 includes a step 310 of image processing and, e.g., extracting one or more characteristic features 220 from the captured image for analysis with respect to at least one boundary condition 222. Based on the type(s) of characteristic features 220 being analyzed, and further based on the at least one boundary condition 222 at issue, output signals may then be generated corresponding to a determined comminution state of the material 158 in the discharge stage.

In an embodiment, the controller 202 or other processing unit linked thereto for the purpose of image processing may utilize image segmentation where available with respect to identified material contours and further for example determine a classification score for each of multiple different material classifications across the captured image and further defining sampling locations which may for example represent individual material fragments, accumulations of fine material 152, or the like. During segmentation, the controller 202 or other processing unit linked thereto for the purpose of image processing carries out image processing or analysis to estimate boundaries of distinct pieces, particles, or objects, referred to as segments, in the comminuted material image (see, e.g., FIGS. 4 and 5). Each sampling location may be assigned a classification score from among a plurality of different available classifications, and which may further comprise a probability value, a binary output, or any of many other classifier output values.

Figure 4:
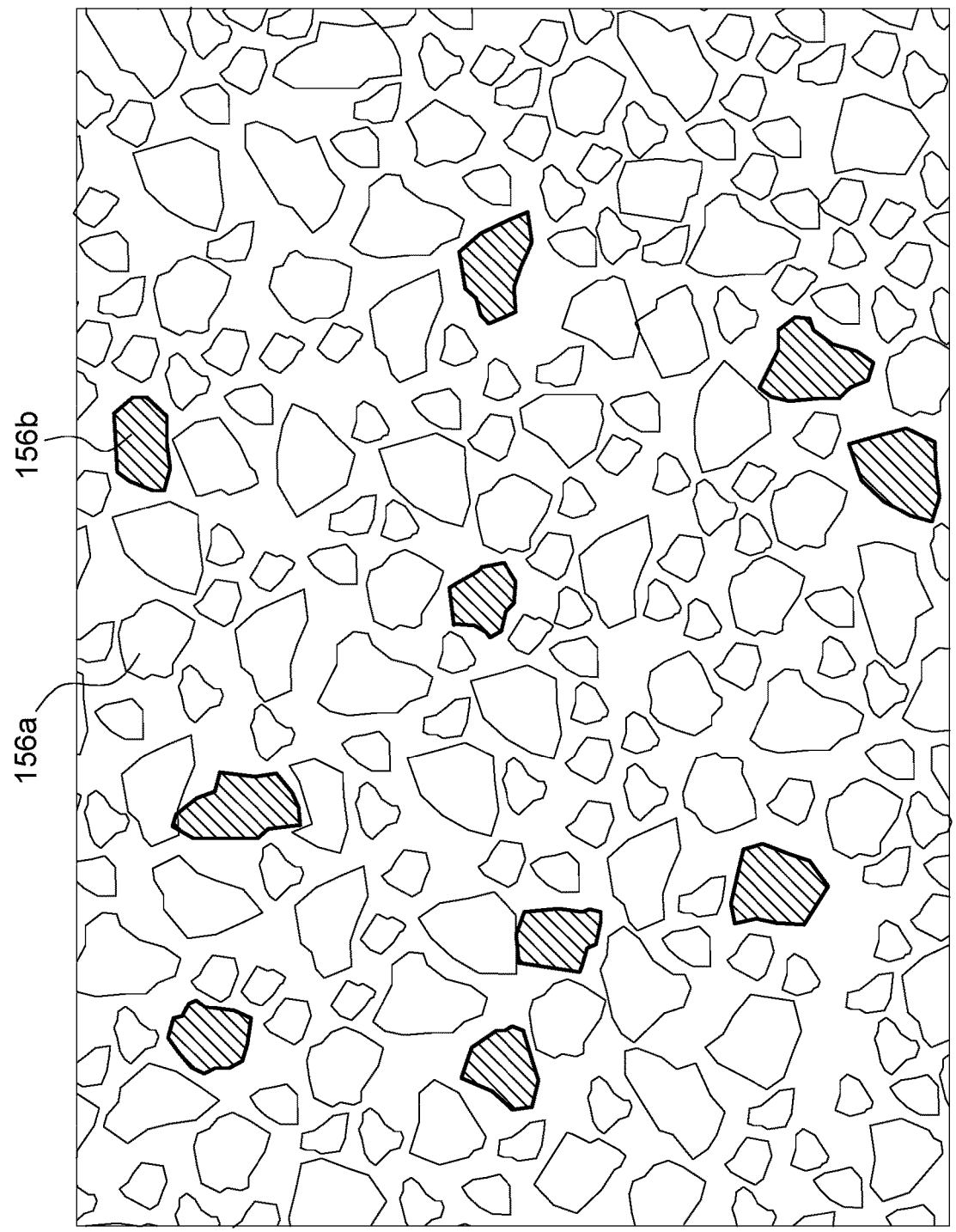
FIG. 4 is a graphical diagram representing exemplary image segmentation regarding material in a captured image for size and/or shape analysis and comparison with respect to defined boundary conditions.

In one example, represented in step 320 and further with illustrative reference to FIG. 4, a characteristic feature 220 extracted from a captured image may be a size of individual material fragments from the comminuted material 158 sample in the field of view 142 of the imaging device 140, and a boundary condition 222 may for example be established in association with an upper threshold size for individual material fragments, a threshold number of individual material fragments being above the threshold size for individual material fragments, a number of individual material fragments above a threshold size 156b relative to a number of individual material fragments below the threshold size 156a, and/or a threshold percentage of individual material fragments within an overall population of such fragments being above the threshold size for individual material fragments.

The controller 202 or other processing unit linked thereto for the purpose of image processing may for example identify a number of fragments exceeding the threshold size 156b for individual material fragments in a particular image sample. When the number of fragments exceeding said threshold size 156b deviate from normal by a predetermined amount, or otherwise exceed a predetermined amount, output signals may be generated to a display unit or alternative interface for alerting the operator to update crusher settings (step 350) and/or control signals may be generated to the crusher drive 228 for automatically regulating the crusher gap 136 (step 325), until the ascertained number of fragments exceeding the threshold size for individual material fragments is deemed acceptable, based for example on reaching a lower threshold.

In some embodiments, the controller 202 may monitor trends over time with respect to the number of fragments exceeding the threshold size 156b for individual material fragments in a particular image sample, wherein the controller 202 may further be configured to predict an upcoming violation of one or more boundary conditions 222 based at least in part on the monitored trend and generate output signals accordingly.

Figure 5:
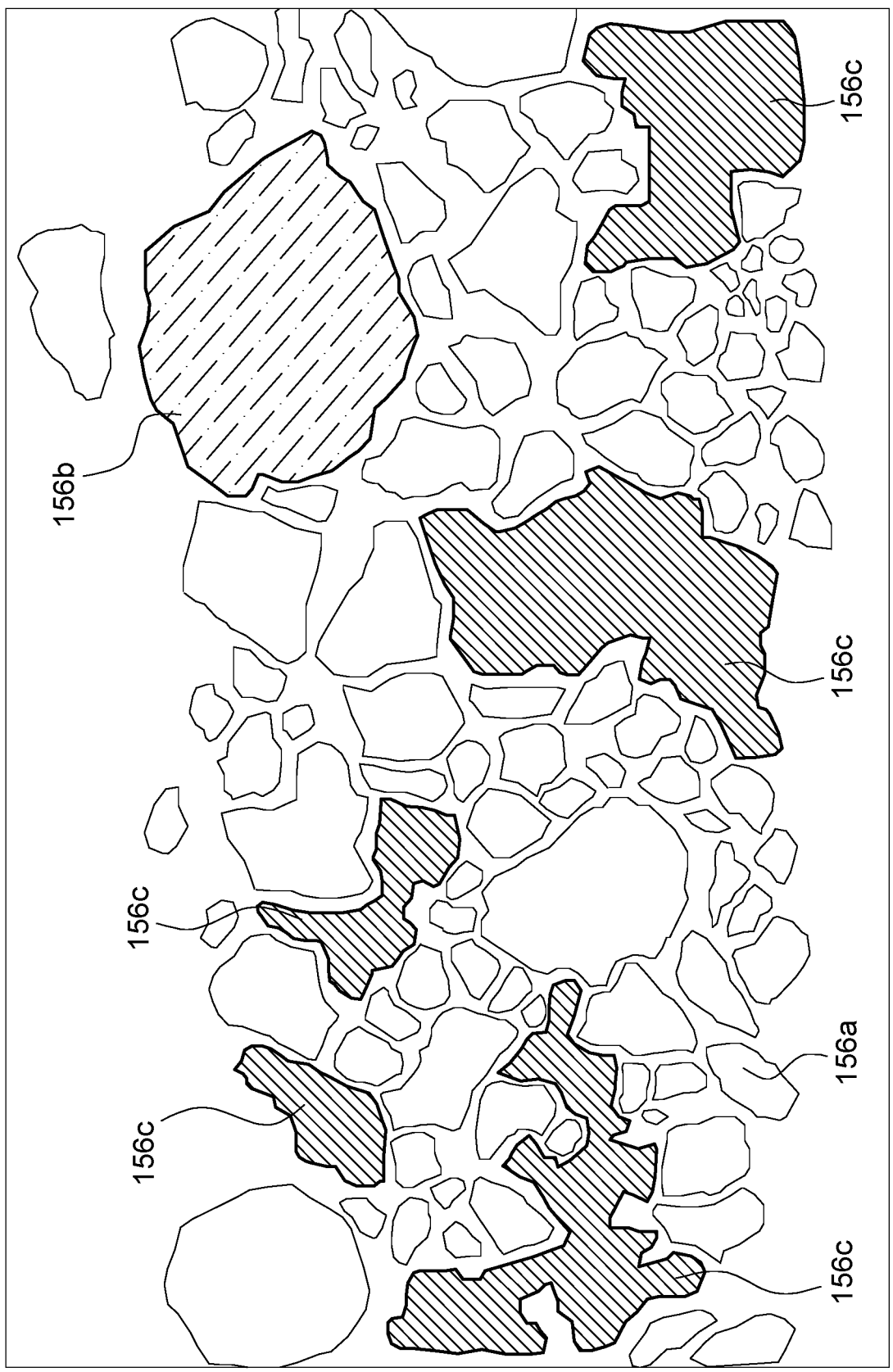
FIG. 5 is a graphical diagram representing exemplary image segmentation regarding material in a captured image for size and/or shape analysis and comparison with respect to defined boundary conditions.

In another example, as represented in step 330 and further with illustrative reference to FIG. 5, and which may be implemented in addition or as an alternative to the preceding step 320, the characteristic feature 220 extracted from the captured image is still the size of individual material fragments. However, the boundary condition 222 may be established in association with a lower threshold size for individual material fragments, a threshold number or area of individual material fragments 156c being below the lower threshold size for individual material fragments, a number or area of individual material fragments 156c below the threshold size relative to a number or area of individual material fragments 156a, 156b above the lower threshold size, etc.

The controller 202 or other processing unit linked thereto for the purpose of image processing may for example identify large amounts of very fine material moving on the discharge belt 108 in a particular image sample, such that a defined boundary condition 222 is violated. In this case, output signals may be generated to a display unit or alternative interface for alerting the operator that the material being selected is of poor quality and should be discarded, and/or that the screens are potentially clogged and may require cleaning (step 350), and/or control signals may be generated to automatically adjust settings on the pre-screen stage to attempt to filter the fine content 152 out of the crusher stage and the discharge stage (step 335).

In some embodiments, the controller 202 may monitor trends over time with respect to an amount of material being below the threshold size 156c in a particular image sample, wherein the controller 202 may further be configured to predict an upcoming violation of one or more boundary conditions 222 based at least in part on the monitored trend and generate output signals accordingly.

In another example, as represented in step 340, and which may be implemented in addition or as an alternative to one or more of the preceding steps 320 and 330, the characteristic feature 220 extracted from the captured image may be a shape of individual material fragments. As may be implemented for example on cone crushing plants 102, the controller 202 or other processing unit linked thereto for the purpose of image processing may for example identify when specified amounts of output material no longer meet a predetermined shape requirement, such that a defined boundary condition 222 is violated. In this case, output signals may for example be generated to a display unit or alternative interface for alerting the operator (step 350).

The boundary conditions and associated parameters for this step 340 may be provided for example in a predetermined library of stored acceptable and/or unacceptable shapes of output material, alone or further in consideration of other boundary conditions 222 such as the relevant sizes or types of output material. For example, a particular shape of output material may be deemed acceptable for output material of a particular size and/or type, or a particular shape of output material may be deemed acceptable based on the shapes of the remainder of the output material.

In an embodiment, the controller 202 may define boundary conditions 222 and/or acceptable/unacceptable comminution states based on user input or other manual triggers.

For example, user input may be provided to specify that a current arrangement or configuration of output (comminuted) material 158 is acceptable, as determined from extracted characteristic features 220 from a current image or data set, wherein the controller 202 dynamically sets or adjusts one or more boundary condition parameters to be used in further analysis of later captured images or data sets.

As another example, such a determination may be performed substantially automatically and using machine learning or the like. The system 100 may be configured to store input data sets over time relating to extracted characteristic features 220 for respective captured images of comminuted material, and further to correlate the stored input data sets with respect to defined comminution states, such as for example via user input characterizing a specific image as corresponding to an unacceptable comminution state. Such correlations may serve as the basis for models that may be selectively retrieved and applied for future captured images or input data sets, and wherein the controller 202 dynamically sets or adjusts one or more boundary condition parameters based on the user input corresponding to an unacceptable comminution state and input data sets corresponding to the respective at least one captured image.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of dynamically monitoring material quality in a comminution system comprising a material crushing stage and a discharge stage, the method comprising:
    capturing an image of comminuted material in the discharge stage via at least one imaging device;
    extracting one or more characteristic features from the captured image for analysis with respect to at least one boundary condition; and
    generating output signals corresponding to a determined comminution state of the comminuted material in the discharge stage based on the analysis with respect to the at least one boundary condition.

2. The method of claim 1, further comprising:
    enabling user input corresponding to an acceptable comminution state; and
    dynamically setting or adjusting parameters for one or more of the at least one boundary condition based on an initial extracted one or more characteristic features responsive to the user input.

3. The method of claim 1, further comprising:
    storing input data sets over time relating to the extracted one or more characteristic features for respective captured images of comminuted material;
    enabling user input corresponding to an unacceptable comminution state for at least one captured image of comminuted material; and
    dynamically setting or adjusting parameters for one or more of the at least one boundary condition based on the user input corresponding to an unacceptable comminution state and input data sets corresponding to the respective at least one captured image.

4. The method of claim 1, further comprising enabling user input selecting the one or more boundary condition to be applied from a plurality of available boundary conditions.

5. The method of claim 1, wherein extracting one or more characteristic features from the captured image for analysis with respect to at least one boundary condition comprises comparing a determined size of comminuted material in the discharge state to a size threshold.

6. The method of claim 5, further comprising determining a relative amount of comminuted material exceeding an oversize threshold and generating the output signals based on the relative amount.

7. The method of claim 6, further comprising automatically controlling a position of at least a first crushing jaw to reduce a material crusher gap in response to the generated output signals.

8. The method of claim 6, further comprising determining a trend over time in a relative amount of comminuted material exceeding the oversize threshold and generating the output signals based on a predicted violation of a predetermined relative threshold value.

9. The method of claim 5, further comprising determining a relative amount of comminuted material below an undersize threshold and generating the output signals based on the relative amount.

10. The method of claim 9, wherein the comminution system further comprises a pre-screen stage, and the method further comprises automatically controlling one or more pre-screen settings in the pre-screen stage in response to the generated output signals.

11. The method of claim 9, further comprising determining a trend over time in a relative amount of comminuted material below the undersize threshold and generating the output signals based on a predicted violation of the predetermined relative threshold value.

12. The method of claim 1, wherein extracting one or more characteristic features from the captured image for analysis with respect to at least one boundary condition comprises comparing a determined shape of comminuted material in the discharge state to a predetermined library of acceptable shape configurations.

13. The method of claim 12, further comprising determining a relative amount of unacceptable shape configurations among the comminuted material.

14. A comminution system comprising:
a material crushing stage comprising a crusher having a settable crusher gap;
a discharge stage configured to receive at least comminuted material from the material crushing stage and to convey the material from the comminution system;
at least one imaging device configured to capture an image of comminuted material in the discharge stage; and
a controller functionally linked to receive the captured image from the at least one imaging device and further configured to
extract one or more characteristic features from the captured image for analysis with respect to at least one boundary condition; and
generate output signals corresponding to a determined comminution state of the comminuted material in the discharge stage based on the analysis with respect to the at least one boundary condition.

15. The comminution system of claim 14, further comprising a user interface functionally linked to the controller, wherein the controller is further configured to:
receive user input corresponding to an acceptable comminution state via the user interface; and
dynamically set or adjust parameters for one or more of the at least one boundary condition based on an initial extracted one or more characteristic features responsive to the user input.

16. The comminution system of claim 14, further comprising a user interface functionally linked to the controller, wherein the controller is further configured to:
store input data sets over time relating to the extracted one or more characteristic features for respective captured images of comminuted material;
receive user input corresponding to an unacceptable comminution state for at least one captured image of comminuted material via the user interface; and
dynamically set or adjust parameters for one or more of the at least one boundary condition based on the user input corresponding to an unacceptable comminution state and input data sets corresponding to the respective at least one captured image.

17. The comminution system of claim 14, wherein:
extracting one or more characteristic features from the captured image for analysis with respect to at least one boundary condition comprises comparing a determined size of comminuted material in the discharge state to a size threshold;
the controller is configured to determine a relative amount of comminuted material exceeding an oversize threshold and generate the output signals based on the relative amount; and
the crushing stage is configured to automatically regulate a position of at least a first crushing jaw to reduce the material crusher gap in response to the generated output signals.

18. The comminution system of claim 14, further comprising a pre-screen stage configured to receive input feed material and to filter and selectively convey the material based on a relative size thereof, further wherein:
the material crushing stage is configured to receive at least a portion of the filtered material from the pre-screen stage;
extracting one or more characteristic features from the captured image for analysis with respect to at least one boundary condition comprises comparing a determined size of comminuted material in the discharge state to a size threshold;
the controller is configured to determine a relative amount of comminuted material below an undersize threshold and generating the output signals based on the relative amount; and
the pre-screen stage is configured to automatically regulate one or more pre-screen filter settings in the pre-screen stage in response to the generated output signals.

19. The comminution system of claim 14, wherein extracting one or more characteristic features from the captured image for analysis with respect to at least one boundary condition comprises comparing a determined shape of comminuted material in the discharge state to a predetermined library of acceptable shape configurations.

20. The comminution system of claim 19, wherein the controller is configured to determine a relative amount of unacceptable shape configurations among the comminuted material.

* * * * *